United States Patent
White

(10) Patent No.: US 9,476,544 B2
(45) Date of Patent: Oct. 25, 2016

(54) UNIVERSAL DISPLAY ARM HOLDER

(71) Applicant: Michael J. White, Ripon, WI (US)

(72) Inventor: Michael J. White, Ripon, WI (US)

(73) Assignee: K-International, Inc., Waukegan, IL (US)

( * ) Notice: Subject to any disclaimer, the term of this patent is extended or adjusted under 35 U.S.C. 154(b) by 0 days.

(21) Appl. No.: 14/657,088

(22) Filed: Mar. 13, 2015

(65) Prior Publication Data

US 2016/0265716 A1 Sep. 15, 2016

(51) Int. Cl.
| | |
|---|---|
| *F16M 13/02* | (2006.01) |
| *F16B 1/00* | (2006.01) |
| *A47F 13/00* | (2006.01) |
| *A47F 5/08* | (2006.01) |

(52) U.S. Cl.
CPC ............ *F16M 13/022* (2013.01); *A47F 13/00* (2013.01); *F16B 1/00* (2013.01); *A47F 5/0807* (2013.01); *A47F 5/0823* (2013.01); *F16B 2001/0035* (2013.01)

(58) Field of Classification Search
CPC .... A47F 5/0815; A47F 5/0823; A47F 5/101; A47F 5/0807; A47F 13/00; F16M 13/022; G09F 3/20; G09F 7/04; G09F 2007/1852; F16B 1/00; F16B 2001/0035
USPC ................. 248/682, 220.31, 220.41, 220.42, 248/220.43, 558, 206.5, 309.4; 211/106.01, 211/57.1, 59.1, 94.01; 40/661.01, 661.11, 40/642.01, 657; 24/303
See application file for complete search history.

(56) References Cited

U.S. PATENT DOCUMENTS

| | | | | |
|---|---|---|---|---|
| 3,452,954 | A * | 7/1969 | Lucietto | A47F 5/0823 185/40 R |
| 3,985,325 | A * | 10/1976 | Ginsburg | A47F 5/0823 248/220.22 |
| 4,026,508 | A * | 5/1977 | Ziegler | A47F 5/0823 211/59.1 |
| 4,362,249 | A * | 12/1982 | Thalenfeld | A47F 5/0823 211/59.1 |
| 4,783,033 | A * | 11/1988 | Valiulis | A47F 5/0823 211/59.1 |
| 5,035,388 | A * | 7/1991 | Nagel | B21F 45/16 248/220.22 |
| 5,722,623 | A * | 3/1998 | Gibson | G09F 3/204 248/201 |
| 6,186,455 | B1 * | 2/2001 | Hollingsworth | A47B 96/061 211/59.1 |
| 7,096,560 | B2 * | 8/2006 | Oddsen, Jr. | F16M 11/04 248/558 |
| 2005/0016943 | A1 * | 1/2005 | Dick | A47F 5/0815 211/70.6 |
| 2005/0189460 | A1 * | 9/2005 | Oddsen, Jr. | F16M 11/04 248/314 |
| 2009/0200441 | A1 * | 8/2009 | Kuhn | A47F 5/0815 248/206.5 |
| 2009/0266951 | A1 * | 10/2009 | Phillips, Sr. | A47F 5/0807 248/206.5 |
| 2010/0276382 | A1 * | 11/2010 | Antonioni | A47F 5/0807 211/59.2 |
| 2015/0273682 | A9 * | 10/2015 | Manalang | B25H 3/028 312/321.5 |

* cited by examiner

*Primary Examiner* — Ingrid M Weinhold
(74) *Attorney, Agent, or Firm* — Schiff Hardin LLP

(57) ABSTRACT

A holder for a display arm includes a body from which extend two bent arms for mounting in a pegboard or slat wall. A tapered slot at the top receives a mounting end of the display arm. The body is inverted and flipped over and magnetically attached to a steel surface by a magnet in the body. A second tapered slot at the top of the body in the inverted orientation receives a mounting end of the display arm.

7 Claims, 5 Drawing Sheets

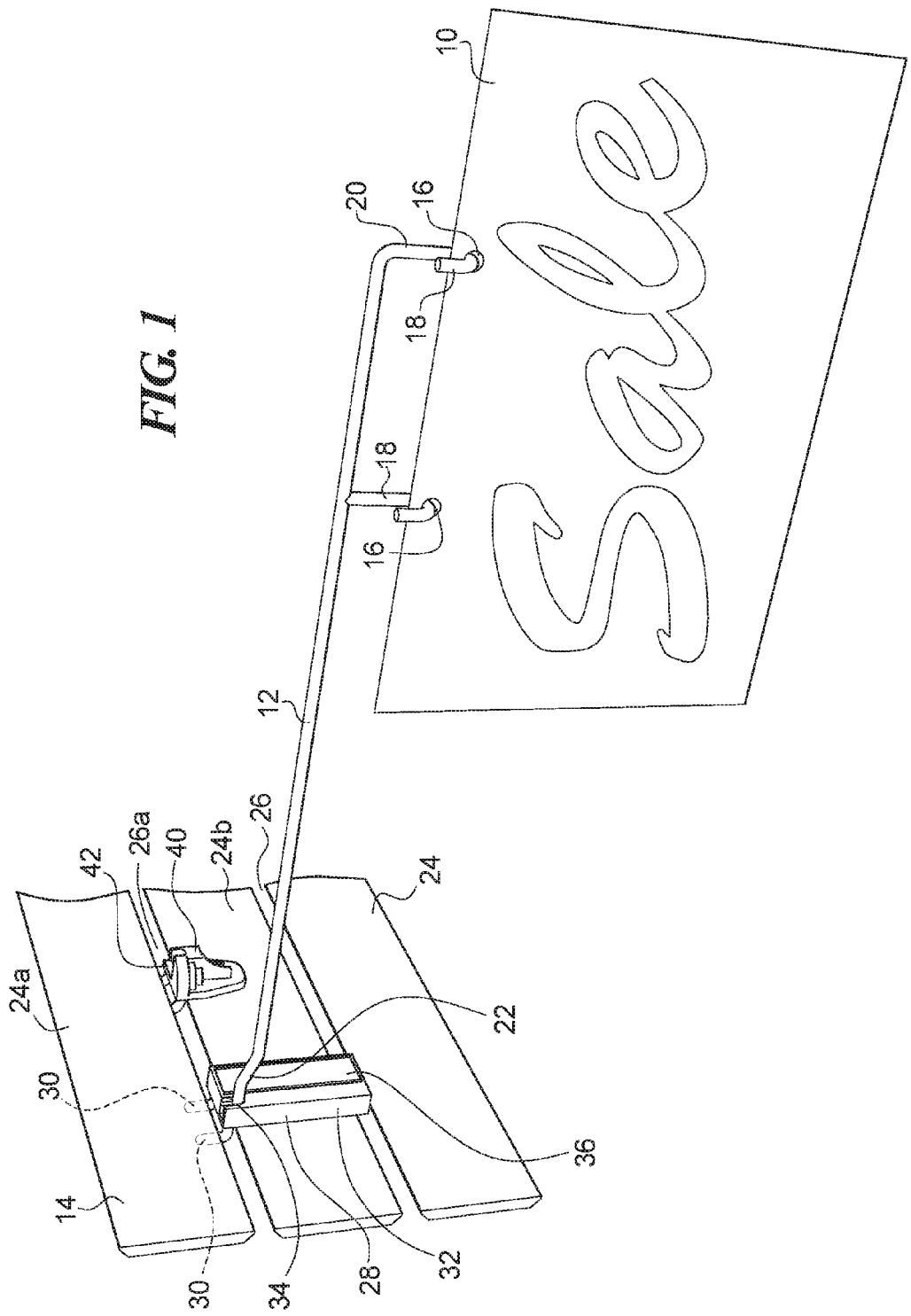

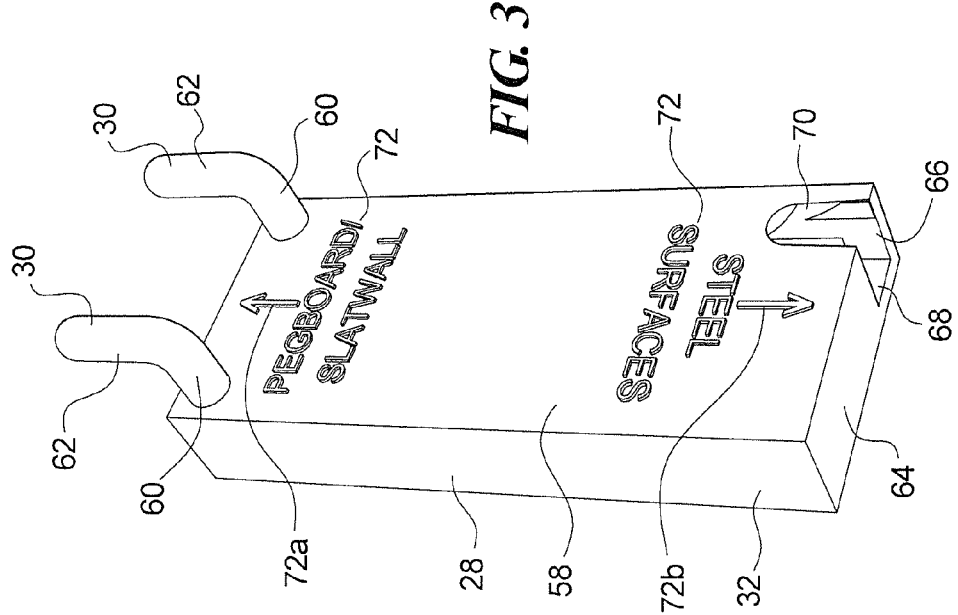
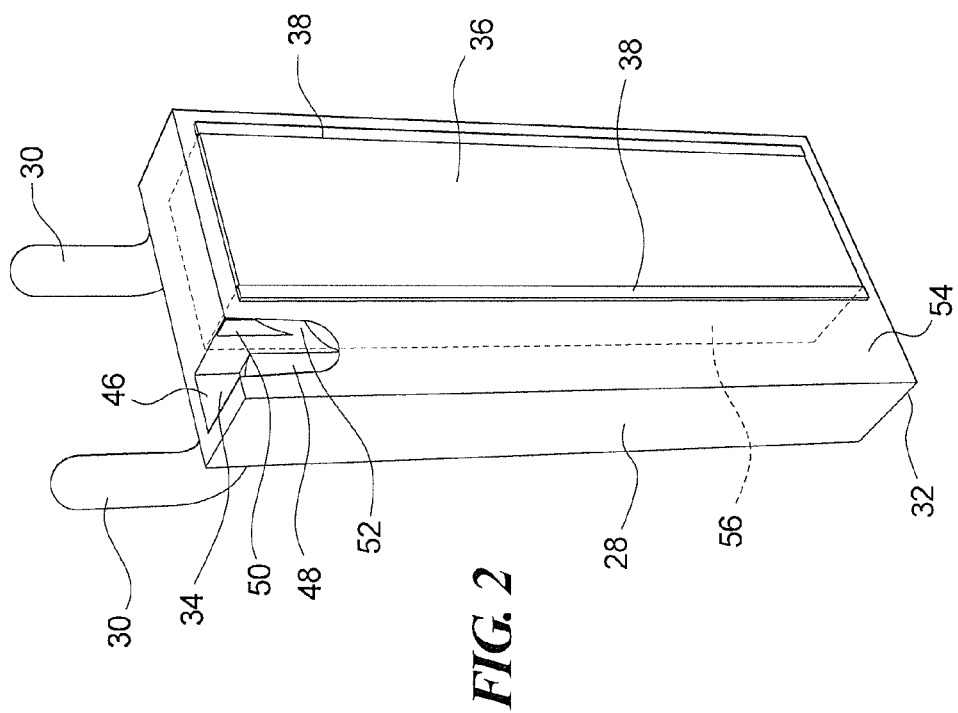

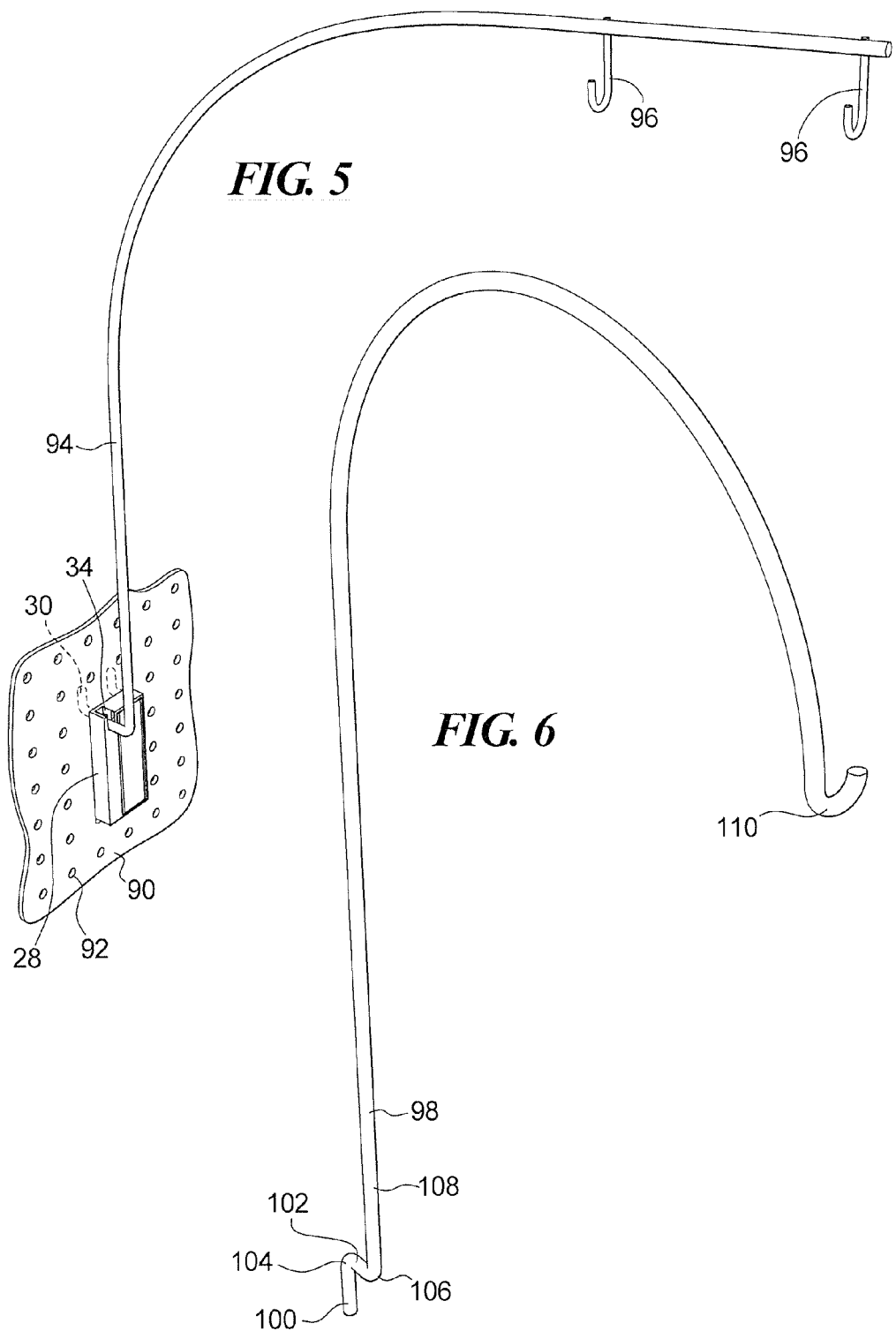

UNIVERSAL DISPLAY ARM HOLDER

BACKGROUND OF THE INVENTION

1. Field of the Invention

The present invention relates generally to a holder for a display arm, and more particularly to a holder for mounting in pegboard to hold a display arm.

2. Description of the Related Art

Stores and other retail establishments, as well as warehouses, storage facilities, shopping malls, schools, businesses, and other entities, utilize signs and category markers on sign holding arms to indicate a location, show a direction, or announce an event, for example. The sign holding arm may be mounted to a fixture, such as a shelf unit, wall unit, or other fixture. The sign holding arm may be mounted in a holder that is affixed to a pegboard, for example.

SUMMARY OF THE INVENTION

The present invention provides a holder for mounting a display arm or the like. In certain embodiments, the holder is configured for mounting to a pegboard, slat wall, or other perforated or slotted surfaces. The holder supports an end of a display arm while mounted in the pegboard or other perforated or slotted surfaces. In certain embodiments, the holder is configured for mounting to a surface lacking perforations or slots and for holding a display arm while mounted on the non-perforated or non-slotted surface. The holder may be configured to mount on either a perforated or slotted surface or on a non-perforated or non-slotted surface while supporting a display arm. The holder may include a magnet for mounting the holder on a ferromagnetic material or other metal or magnetically attractive material.

The holder may be configured for supporting display arms of different sizes and different shapes. A single holder, or a single size of holder, may be utilized for mounting display arms of different sizes.

BRIEF DESCRIPTION OF THE DRAWINGS

FIG. 1 is a top, side perspective view of a holder supporting a display arm and sign while mounted on a slat wall, also shown is a prior art holder for a display arm;

FIG. 2 is a top perspective view of the display arm holder in a front view;

FIG. 3 is a bottom perspective view of the display arm holder in a back view;

FIG. 5 is a top perspective view of the display arm holder mounted in a pegboard and supporting a display arm of a second embodiment;

FIG. 6 is a perspective view of a further embodiment of a display arm for use with the display arm holder.

DETAILED DESCRIPTION OF THE PREFERRED EMBODIMENTS

Figure 4:
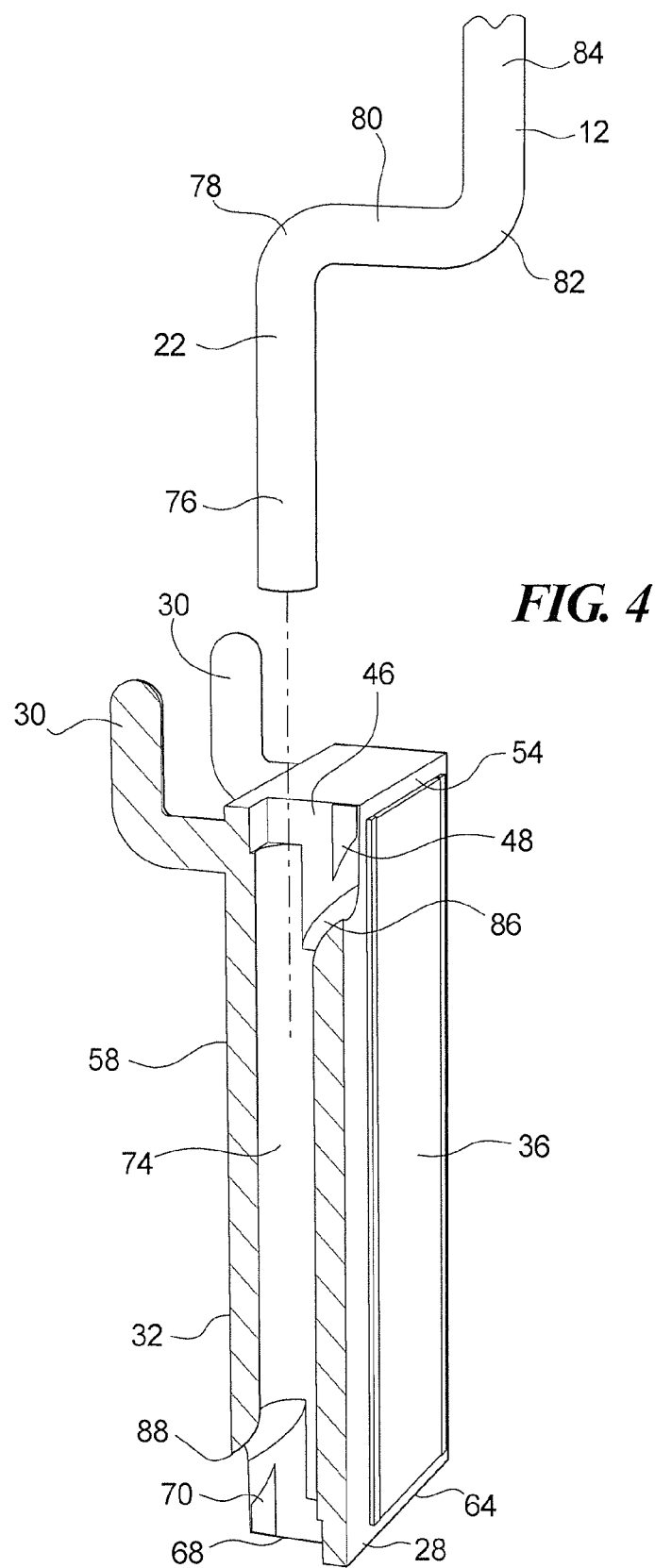
FIG. 4 is a side perspective view, partially in cross section, of the display arm holder, showing an end of a display arm being inserted therein.

Turning first to FIG. 1, a sign 10 is supported on a display arm 12 that projects from a mounting surface 14. The sign 10 may be any type of display or sign. For example, the sign or display 10 may indicate a product location, a product promotion, store department location or category, announce a sale or a holiday event or other event, or provide any other information, messaging or indication. The display arm 12 and sign may be referred to as an aisle sign or display. In the trade, such signs that extend into the aisles of a store, for example, may be referred to as aisle violator. The display arms and signs are generally positioned above the heads of the customers, or just out beyond products being sold, to avoid being bumped and to attract attention.

The sign or display include two openings 16 at which the display arm is attached. The display arm 12 has two hooks 18 at the display holding end 20 on which the sign or display 10 is mounted. Other sign or display holding means may be provided. The display arm 12 of the illustrated embodiment includes a generally linear elongated shaft that extends from the display holding end to a mounting end 22. The mounting surface 14 of the illustrated embodiment is a slat wall formed of horizontally positioned parallel slats 24 spaced from one another by gaps 26.

The mounting end 22 of the display arm 12 is mounted in a display arm holder 28 that is mounted to the slat wall 14. The display arm holder 28 includes a pair of bent arms 30 that extend from a body 32 of the holder 28, through the slot 26a, and into engagement with a back surface of a slat 24a. The body 32 of the display arm holder 28 bears against an outside surface of a slat 24b that is adjacent and below the slat 24a behind which the bent arms 30 are disposed. The display arm holder 28 has a slot 34 into which the mounting end 22 of the display arm 12 is mounted. The body 32 includes a magnet 36 on the surface facing away from the mounting surface 14.

Also shown in FIG. 1 is a prior art holder 40 for a display arm. The prior art holder has a slot 42 for receiving a display arm of a particular diameter. Display arms of other diameters do not fit into the holder 40 or fit loosely in the prior art holder 40. The prior art holders are provided in different sizes to accommodate different sized display arms, the different sizes often being color coded. The prior art holder 40 includes a pair of bent arms extending through the slot 26a between the slats 24a and 24b in the slat wall 14.

The holder 28 is shown with two bent arms 30 in the illustrated embodiment. The holder may be provided with a single bent arm or with three or more bent arms. Depending on the size and shape of the opening in the perforate wall or slat wall, a bent arm of other sizes and shapes may be provided including stamped or flat arms.

With reference to FIG. 2, the display arm holder 28 includes the pair of bent arms 30. The arms 30 are configured for engagement in a slat wall, pegboard, or other perforated surface. The perforations may be circular, square, diamond shaped, or of other shapes. The slot 34 is shaped to receive the mounting end of a display arm. The slot 34 includes a top opening 46 for receiving a downwardly directed portion of the mounting end and a front opening 48 for receiving a sidewardly directed portion of the mounting end of the display arm. The top opening 46 is in communication with and aligned with an internal channel, as will be shown in FIG. 4.

The front opening 48 of certain embodiments is tapered from a wider width at open end side wall portions 50 of the slot at the top of the body 32 to a narrower width at closed end side wall portions 52 of the slot. The front opening 48 forms a tapered slot having a gradual narrowing from the open end side wall portions 50 to the closed end side wall portions 52. The tapered slot 48 accepts and holds display arms of different diameters. For example, a larger diameter or width of display arm will fit into the tapered slot 48 and bear against the sides of the slot at the open end side wall portions 50, and thereby is held in place. Middle diameter or width display arms will fit into the tapered slot 48 and bear against the sides near the middle of the slot. Smaller diameter or width display arms will fit into the tapered slot 48 and bear against the slot near or at the bottom or closed end side wall portions 52. The slot 48 may be tapered to any degree required to fit the display arms of different sizes.

The display arms that may be used in certain embodiments are formed of wires of diameters 0.186 inch, 0.234 inch, and 0.212 inch. The tapered slot 48 is shaped to accommodate each of these display arms. The display arms as shown are of generally cylindrical wire. Other shapes of display arms may be used with the present holder. Other sizes of display arms are of course possible.

The body 32 of the display arm holder 28 of the illustrated embodiment is of a generally rectangular box shape. The body 32 of certain embodiments is formed of plastic, although other materials or combinations of materials are possible. It is possible that the arms 30 may be formed of a different material or in a different piece than the body such as metal arms affixed to a plastic body. A front surface 54 is generally flat for mounting on a flat mounting surface. The flat front surface 54 includes the magnet 36. The magnet 36 of the illustrated embodiment includes a magnet body on either side of which are two steel plates 38. The magnet body may be a ceramic magnet body or other magnet type. A single piece magnet may be provided or a multiple piece magnet may be used. Any type or construction of magnet may be provided. The magnet 36 may be exposed or may be enclosed within the body 32. The magnet 36 may be provided with a non-scratch covering or coating, or may be provided with a separate non-scratch cover. The magnet 36 is mounted in a recess 56 within the body 32 and may be held therein by glue, a friction fit, welding, riveting, or other means for fastening the magnet.

In FIG. 3, the display arm holder 28 is turned over to reveal the back side 58. The arms 30 extend from the back side 58 in a perpendicular portion 60. The perpendicular portion 60 connects to a vertical portion 62, which engages behind slat wall slats or pegboard panels. The arms 30 are generally cylindrical in shape to fit into circular peg board openings. The arms 30 can also be used in other shaped openings, including slotted, square, rectangular, and diamond shaped openings of a perforate panel.

At a lower end 64 is a display arm receiving slot 66 of a similar shape and configuration as the slot 34 on the opposite end at the other side. The display arm receiving slot 66 includes an opening 68, also referred to as a top opening, and a tapered front opening slot 70. The references to top and front are relative to the position of the display arm holder 28 when used in the magnet mounting position, as will be shown and described. The back side 58 includes indicia 72 to indicate orientation directions to a user. For example, the indicia 72 may include a first indicia 72a that includes an arrow that is directed up when the holder 28 is used with a pegboard or slat wall. The first indicia 72a includes the words "pegboard/slat wall" or similar words or indicia. A second indicia 72b includes an arrow that is directed up when the holder 28 is used on a steel surface, for example. The second indicia includes the words "steel surfaces" or similar words or indicia. Any indication of use direction and/or mounting surface may be provided.

Turning to FIG. 4, the display arm holder 28 includes the bent arms 30 extending from the back surface 58 and the magnet 36 on the front surface 54. The top opening 46 is in communication with an internal passage 74. The internal passage 74 extends through the body 32 of the holder 28 and to the top opening 68 at the opposite end of the body 32. The internal passage 74 is configured to accept a mounting end 22 of a display arm 12, no matter the length of the mounting end. It is foreseeable that the mounting end 22 of the display arm 12 could extend through the holder 28.

The mounting end 22 of the display arm 12 as shown in FIG. 4 includes a first end portion 76 connected by a first bend 78 to a right angle portion 80. The right angle portion 80 is connected by a second bend 82 to display shaft portion 84. As indicated by the broken line, the first end portion 76 is inserted through the top opening 46 and extends into the internal passage 74. The first bend 78 of the display arm 12 is engaged by a support edge 86 of the display arm holder 28 for a display arm that is of a smaller diameter and seats fully into the tapered slot 48. For a larger diameter display arm 12, the sides of the tapered slot 48 engage the sides of the right angle portion 80 and hold the display arm in position in the holder 28. In either instance, the first end portion 76 extends into the internal passage 74.

The display arm 12 of any size or shape has the first end portion 76 to extend into the internal passage 74 of the holder 28 and a right angle portion 80 to engage either the sides of the tapered slot 48 or the support edge 86. Variations in the shape of the display arm 12 are possible that do not include the second bend 82. For example, the display arms of FIGS. 1 and 7 extend straight out rather than extending upwardly from the holder.

As is apparent at the lower end 64 of the holder 28, the tapered slot 70 includes a support edge 88 as well. The opening 68 and tapered slot 70 are shaped substantially identical to those at the other end of the body 32 and function in substantially the same way.

With reference now to FIG. 5, a pegboard 90 is provided in a generally vertical position with clearance behind the pegboard 90 for receiving pegs or the like. The pegboard includes a regular pattern of openings 92. The opening 92 are shown as circular openings. Other shapes of openings are also possible, including square openings, rectangular openings, diamond shaped openings, slots, or other shapes. Any perforate surface may be provided as the pegboard. The holder 28 is mounted to the pegboard 90 by positioning the arms 30 into the openings 92. The holder 28 supports a display arm 94 that is mounted in the slot 34. The display arm 94 is a curved arm that includes two hooks 96 on which a display or sign may be mounted. The display arm 94 holds the display or sign up high for improved visibility. The hooks 96 permit the display or sign to swing when bumped or move with breezes, enhancing the chance that a customer will notice the sign or display.

FIG. 6 is a shepherd's hook-shaped display arm 98. The display arm 98 includes a first end 100 with a right angle portion 102 connected at a first bend 104 that fit into the holder 28. The display arm 98 includes a second bend 106 that connects to the arm shaft 108. The arm shaft 108 includes a radius curve with a hook 110 at the end. A single handing point display or sign may be affixed to the single hook 110. Other configurations of display arms may be provided. The display arms may be of a variety of diameters, such as various diameters of wire, yet still fit into the same display arm holder 28.

Figure 7:
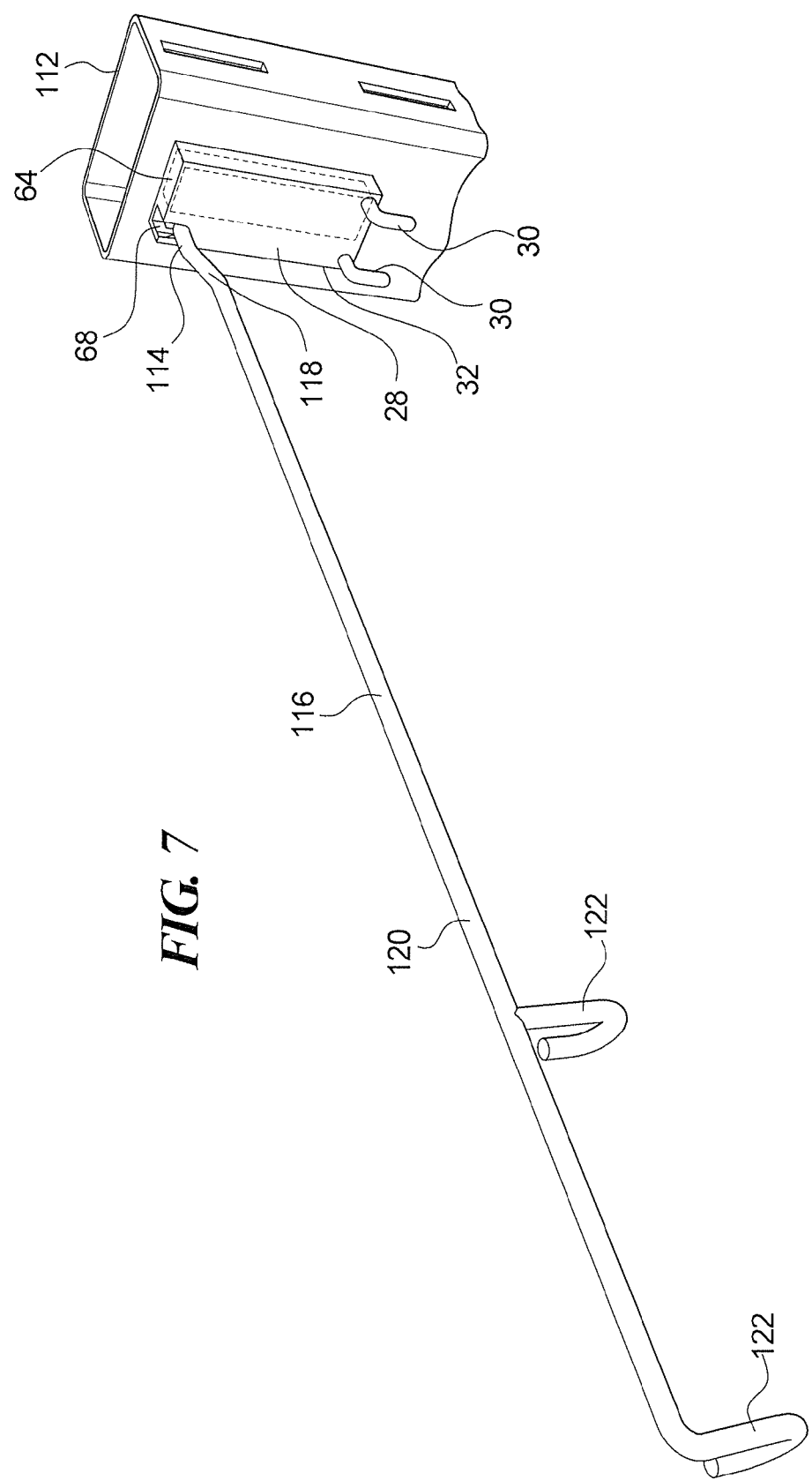
FIG. 7 is a side perspective view of the display arm holder mounted to a non-perforated surface and holding a display arm.

Lastly, FIG. 7 shows the display arm holder 28 mounted to a ferromagnetic material, such as a surface of a steel beam or other steel member 112. The magnet may be attached to other metals or magnetically attractive materials as well. The display arm holder 28 is flipped over so that the magnet 36 on the flat front surface 54 is against the steel member 112.

Further, the display arm holder 28 is turned end for end so that the lower end 64 is directed upwardly. The display arm holder 28 is affixed magnetically to the steel member 112. In certain embodiments, the magnet 36 has a strong magnetic holding force to support the holder 28, display arm, and a sign or display.

The opening 68 is at the top of the holder 28 in this position, providing a top opening for receiving a mounting end 114 of a display arm 116. The mounting end 114 includes a first end (not visible in this view) extending into the internal passage 74 of the holder 28. A right angle portion of the mounting end 114 fits into the tapered slot at the opening 68. The display arm 116 includes a slight S-bend 118 from the right angle portion to the display arm shaft 120. The display arm shaft 120 includes a pair of hooks 122 on which may be supported a display or sign. The same display arms used for the slat wall or pegboard may be mounted in the holder in the steel surface mounting position.

The display arm holder 28 of FIG. 7 is shown supported on a vertical support beam 112 such as a vertical support for a shelf. The holder 28 may be attached to shelving units, cabinets, walls, posts, support beams, girders, support struts, or any object to which the magnet will attach. It is also envisioned that an adhesive may be applied to permanently affix the holder 28 to a surface. For example, a removable adhesive, double stick tape, glue, or permanent adhesive may be used to mount the holder 28.

The display arm holder 28 may be used to hold display arms of any shape on any surface. The holder may be used to hold other articles instead of display arms, as will be apparent to those of skill in the art. Any type or manner of item may be held in the holder.

In the position shown in FIG. 7, the bent arms 30 extend from the body 32. It is foreseen that the bent arms may be removable, or may be pivotable or otherwise movable to a position within or below the body, for example, when not in use in a pegboard or slat wall.

A holder for a display arm includes a body from which extends two bent arms for mounting in a pegboard or slat wall. A tapered slot at the top receives a mounting end of the display arm. The body is inverted and flipped over and magnetically attached to a steel surface by a magnet in the body. A second tapered slot at the top of the body in the inverted orientation receives a mounting end of the display arm.

In certain embodiments, the display arms and display arm holders are of a black color or other inconspicuous color. The display arms hold the signs or displays in conspicuous positions extending into the aisles of the store, such as above the heads of the store customers. In this way, the signs and displays do not get bumped during movement of the customers about the store.

Thus, there is shown and described a display arm holder that may be mounted to a steel or other ferromagnetic surface for supporting a display arm, or may be mounted to a pegboard or slat wall to support a display arm. Display arms of various diameters, shapes or sizes may be mounted with the present holder. A universal display arm holder is thereby provided.

Although other modifications and changes may be suggested by those skilled in the art, it is the intention of the inventors to embody within the patent warranted hereon all changes and modifications as reasonably and properly come within the scope of their contribution to the art.

I claim:

1. A display arm holder, comprising:
    a body having first and second ends and front and back surfaces;
    at least one bent arm extending from the back surface of the body;
    a magnet mounted in the body;
    the body defining a first arm receiving opening at the first end of the body and a second arm receiving opening at the second end of the body;
    wherein the at least one bent arm is configured for mounting in a pegboard or slat wall as a first mounting option, and the magnet is disposed for magnetically attaching to a ferromagnetic material at the front surface of the body as a second mounting option;
    wherein the first arm receiving opening is configured to receive a display arm inserted from the first end when the body is mounted with the at least one bent arm affixed to a pegboard or slat wall according to the first mounting option, and the second arm receiving opening is configured to receive a display arm inserted from the second end when the body is mounted with the front surface of the body magnetically affixed to a ferromagnetic surface according to the second mounting option.

2. A display arm holder as claimed in claim 1, wherein the first arm receiving opening and the second arm receiving opening are connected in communication by an internal passage extending through the body.

3. A display arm holder as claimed in claim 1, wherein at least one of the first arm receiving opening and the second arm receiving opening include a tapered slot configured to receive display arms of different shapes and diameters.

4. A display arm holder as claimed in claim 1, wherein the first arm receiving opening and the second arm receiving opening each include a tapered slot.

5. A display arm holder as claimed in claim 1, further comprising:
    indicia on the body to indicate two alternative mounting positions.

6. A method of mounting a display arm on generally vertical surfaces, comprising:
    selectively mounting a display arm holder alternatively between a first mounting position and a second mounting position;
    wherein mounting a display arm on a first generally vertical surface in the first mounting position includes:
    inserting bent arms extending from a back surface of the display arm holder into openings in the first generally vertical surface;
    positioning a body of the display arm holder against the generally vertical surface in a first orientation;
    inserting a mounting end of the display arm in a first opening at a top of the body of the display arm holder in the first orientation; and
    wherein mounting a display arm on a second generally vertical surface in the second mounting position includes:
    positioning the display arm holder to an inverted second orientation, the inverted second orientation being inverted relative to the first orientation;
    affixing a front surface of the display arm holder in the inverted second orientation to the second generally vertical surface; and
    inserting a mounting end of the display arm in a second opening at a top of the body of the display arm holder in the inverted second orientation, the top of the body in the inverted second orientation being a bottom of the body in the first orientation.

7. A method as claimed in claim 6, wherein the affixing in the inverted second orientation includes magnetically affixing the display arm holder to the second generally vertical surface.

\* \* \* \* \*